United States Patent
Wiatrowski et al.

(10) Patent No.: US 7,369,869 B2
(45) Date of Patent: May 6, 2008

(54) METHOD AND SYSTEM OF SCANNING A TDMA CHANNEL

(75) Inventors: David G. Wiatrowski, Woodstock, IL (US); Thomas B. Bohn, McHenry, IL (US); Satyanarayan R. Panpaliya, Palatine, IL (US); Thomas J. Senese, Schaumburg, IL (US)

(73) Assignee: Motorola, Inc., Schaumburg, IL (US)

(*) Notice: Subject to any disclaimer, the term of this patent is extended or adjusted under 35 U.S.C. 154(b) by 626 days.

(21) Appl. No.: 10/899,479

(22) Filed: Jul. 26, 2004

(65) Prior Publication Data

US 2006/0018292 A1 Jan. 26, 2006

(51) Int. Cl.
*H04Q 7/20* (2006.01)

(52) U.S. Cl. .............. 455/518; 455/422.1; 455/435.2; 455/455; 455/458; 370/345

(58) Field of Classification Search ............. 370/345; 455/434, 435.2, 518, 519, 521
See application file for complete search history.

(56) References Cited

U.S. PATENT DOCUMENTS

| | | | |
|---|---|---|---|
| 5,214,790 A * | 5/1993 | Kozlowski et al. | ......... 455/518 |
| 6,108,542 A | 8/2000 | Swanchara et al. | |
| 6,131,031 A | 10/2000 | Lober et al. | |
| 6,512,928 B1 | 1/2003 | Janky et al. | |
| 2006/0013188 A1 * | 1/2006 | Wiatrowski et al. | ......... 370/347 |

* cited by examiner

*Primary Examiner*—Temica Beamer
(74) *Attorney, Agent, or Firm*—Indira Saladi; Valerie M. Davis

(57) ABSTRACT

A method and system for scanning a TDMA channel by a subscriber unit in a wireless communications landscape 100 is disclosed. The subscriber unit locks onto a channel that is preprogrammed in the subscriber unit. A base radio transmits a control message to the subscriber unit. The control message informs the subscriber unit of activity present on the channel. The subscriber unit receives and decodes the control message to determine whether there is activity on the channel. If there is, the subscriber unit determines whether the activity is of interest. If it is, then the subscriber unit remains on the channel to receive the activity present on the channel.

24 Claims, 3 Drawing Sheets

METHOD AND SYSTEM OF SCANNING A TDMA CHANNEL

FIELD OF THE INVENTION

The present invention relates generally to wireless communications systems and more specifically to scanning in a time division multiple access (TDMA) system.

BACKGROUND OF THE INVENTION

A wireless communications system may generally comprise a set of "subscriber units," typically subscriber units are the endpoints of a communication path, and a set of "base radios," (also known as "repeaters") typically stationary and the intermediaries by which a communication path to a subscriber unit (SU) may be established or maintained. One such type of system is a time division multiple access (TDMA) communication system where the radio medium (or RF frequency) is divided into time slots to carry the communications of the system. Because the communication system carries many communications at one time, a subscriber unit may want to monitor other communications in the system. Scan is a feature that allows a subscriber unit to monitor other communications in the system.

SUs of the wireless communications system utilize a feature termed "scan" where an SU locks on to specific RF frequencies in a preprogrammed list in the SU. The RF frequencies in the scan list may be associated with more than one wireless communications system. For example, an SU may have RF frequencies from the Schaumburg fire department and the Rolling Meadows fire department in its scan list. If the preprogrammed scan list is very long and has many RF frequencies, then the scan feature takes a long time. Further, in the usual case, when many of the RF communications are normally of no interest to the scanning SU, the scanning SU spends a lot of time listening to communications that are of no interest to it. For example, this occurs when an RF frequency is included in the preprogrammed scan list, but the current communication is addressed to a SU or group of SUs that are of no interest to the scanning SU.

Accordingly, there exists a need for scanning a TDMA channel which improves the amount of time that an SU spends scanning.

BRIEF DESCRIPTION OF THE FIGURES

An illustrative embodiment of the invention is now described, by way of example only, with reference to the accompanying figures in which.

Figure 1:
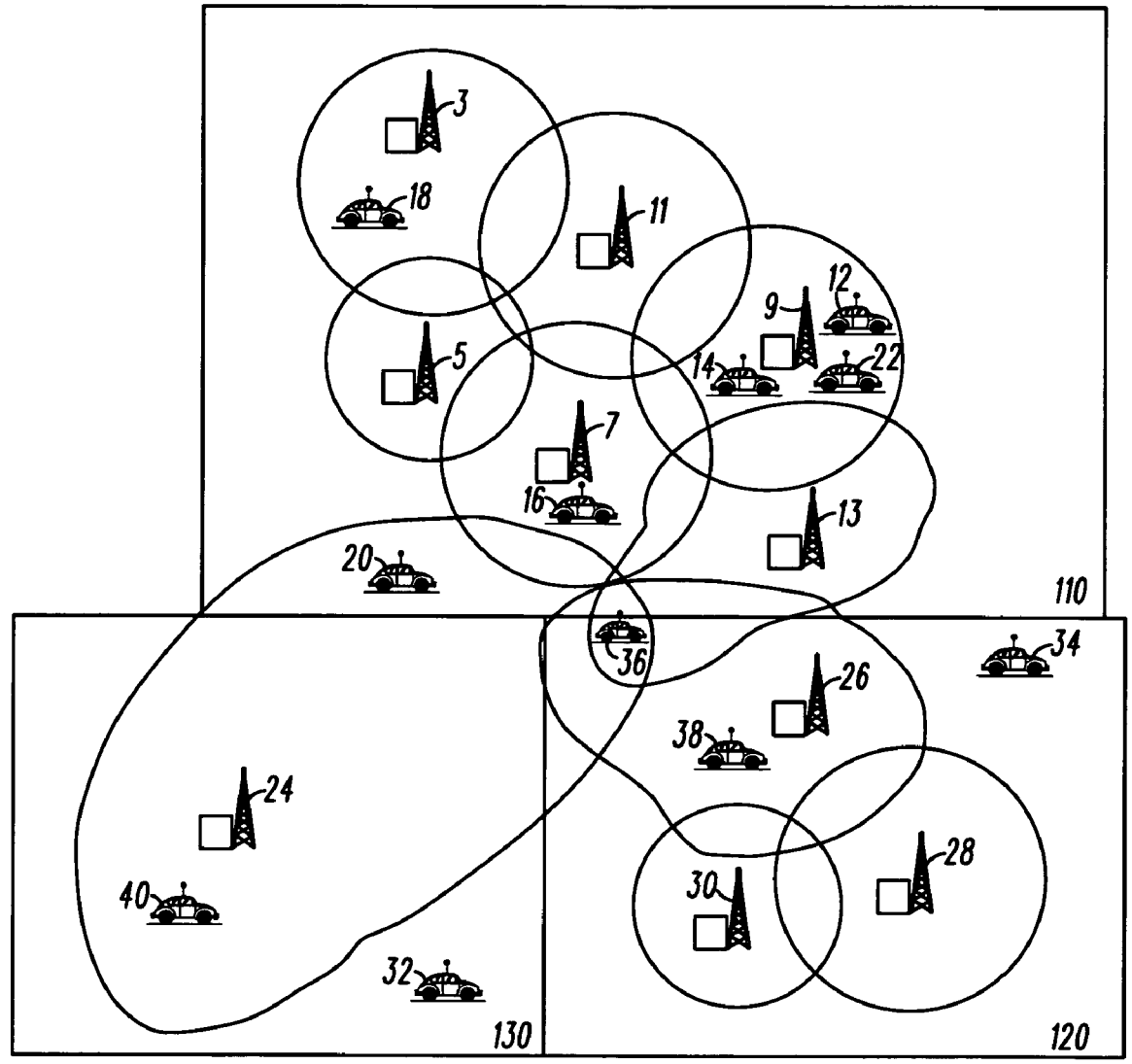
FIG. 1 is a block diagram of an example wireless communications landscape in accordance with an embodiment of the invention.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

DETAILED DESCRIPTION

Referring now to FIG. 1, there is shown an example of the method and apparatus of the present invention as it may be employed and incorporated into a typical wireless communications landscape 100 having system 110, system 120, and system 130. The illustrated example has three systems 110, 120, 130 whereby a system is comprised of a multiplicity of communication resources of RF frequencies, base radios (BRs) and subscriber units (SUs) optionally managed by system controllers (not shown) whereby the SUs send and receive communications with BRs (also known as "repeaters").

System 110 comprises a plurality of cells, each with a BR 3, 5, 7, 9, 11, 13 typically located at the center of the cell, and a plurality of SUs 12, 14, 16, 18, 20, 22 all of which are communicating on RF frequencies assigned to system 110. The SUs 12, 14, 16, 18, 20, 22 in system 110 may include all the RF frequencies associated with the BRs 3, 5, 7, 9, 11, 13 in system 110 in their preprogrammed scan lists. System 120 comprises a plurality of cells, each with a BR 26, 28, 30 typically located at the center of the cell, and a plurality of SUs 34, 36, 38 all of which are communicating on RF frequencies assigned to system 120. The SUs 34, 36, 38 of system 120 may include all the RF frequencies associated with BRs 26, 28, 30 in their preprogrammed scan lists. Further, SU 36 may include RF frequencies associated with the BRs in system 110 and with the BR in system 130 since the SU 36 is sufficiently close to all three systems 110, 120, 130. System 130 comprises a cell with a BR 24 and SUs 32, 40 all of which are communicating on RF frequencies assigned to system 130. Further, BRs 3, 13, 24, 28 may all be operating on the same RF frequency, but using a different color code since the BRs are separated by great geographical distance.

A BR preferably comprises fixed equipment for communicating data/control and voice information to and from the SUs for facilitating communications between the SUs in the wireless communication landscape 100. A subscriber unit (SU) preferably comprises mobile or portable devices (such as an in-car or handheld radios or radio telephones) capable of communicating with a BR using time division multiple access (TDMA) or time division duplex (TDD) techniques as further described herein, in which specified time segments are divided into assigned time slots for individual communication. As is known in the art, each RF frequency in the system carries time slots whereby each time slot is known as a "channel." Thus, for the BRs shown in FIG. 1, each BR has two channels associated with the coverage area.

In an illustrative embodiment of the present invention, the wireless communications landscape 100 assumes a two slot TDMA communications system; however, other slotting ratios may be used in the TDMA communications system and still remain within the spirit and scope of the present invention. In an illustrative embodiment, the SU determines time slot numbering by decoding a TDMA channel field in a Common Announcement Channel (CACH) burst whereby the CACH burst is used for signaling information in the wireless communications landscape 100. In the illustrative embodiment of a two slot TDMA communications systems, the CACH burst is common to timeslot 1 and to timeslot 2.

As is known in the art, "color code" is a common identifier used by a group of SUs which utilize the same BR. For example, as shown in FIG. 1, SUs 12, 14, 22 are in one color code because they utilize the same BR, namely BR 9. Further, a color code field may be present in an embedded signaling message and a general data burst to provide a means of addressing a radio network or a specific repeater so that co-channel interference may be rejected. Further known in the art, a "talkgroup" is a group of SUs that share an RF frequency and timeslot and have the same color code. In an illustrative embodiment, a talkgroup is identified by a 16-bit talkgroup identifier(TGID) and an individual subscriber unit is identified by a 24-bit subscriber unit identifier (SUID). Thus, in an illustrative embodiment, SUs that share a color code are further subdivided into talkgroups so that SUs in one talkgroup do not hear SUs in another talkgroup.

As used herein, the terms "communication" and "transmission" are used interchangeably and refer to contiguous TDMA bursts emanating from one radio in one timeslot. As such, transmissions may generically refer to voice, data or control information relating to the wireless communications landscape 100. The term "call" refers to related voice transmissions between SUs in the wireless communications landscape 100.

As is known in the art, the term "burst" refers to the smallest standalone unit of a TDMA transmission. In an illustrative embodiment, for a burst found in a Motorola Low Tier Digital system, a defined transmission is 216 bits of payload and 48 bits of synchronization or embedded signaling. The defined transmission takes 27.5 msec to transmit and may be followed by 2.5 msec of guard time or the CACH burst. Thus, a "burst" in such a Motorola Low Tier Digital system is 30 msec.

In an illustrative embodiment, a scan is performed in at least one of three situations: 1) when the SU powers on where the receiver automatically changes "channels" in a set order with a list preprogrammed in the SU, 2) when a user of the SU manually taps a button or turns a dial to manually step through frequencies preprogrammed in the SU, and 3) when a user of the SU sets the SU to scan mode where the receiver automatically changes frequencies in a set order with a list preprogrammed in the SU.

Further, there may be different types of scanning that a SU performs. An SU may be programmed to perform scan based upon a characteristic of the active transmission such as whether the active transmission is voice, data, group, individual, emergency, and non-emergency. For example, a scanning SU may be programmed to scan for channels only carrying voice transmissions. Further, a scanning SU may be programmed to scan for channels only carrying data transmissions. Further yet, a scanning SU may be programmed to scan for channels carrying voice transmissions that are addressed to individual SUs and not voice transmissions that are addressing talkgroups. Further yet, a scanning SU may be programmed to scan for channels carrying data transmissions that are addressed to individual SUs and not data transmissions addressing talkgroups. Another example, a scanning SU may be programmed to scan for channels carrying any emergency transmissions regardless of the group that the active transmission is associated with. Yet another example, a scanning SU may be programmed to scan for channels carrying only non emergency transmissions regardless of the group that the active transmission is associated with. As can be imagined, there are numerous examples combining the characteristics to program a scanning SU to only search for specific active transmissions and the examples listed above are only illustrative and not exhaustive.

Figure 2A:
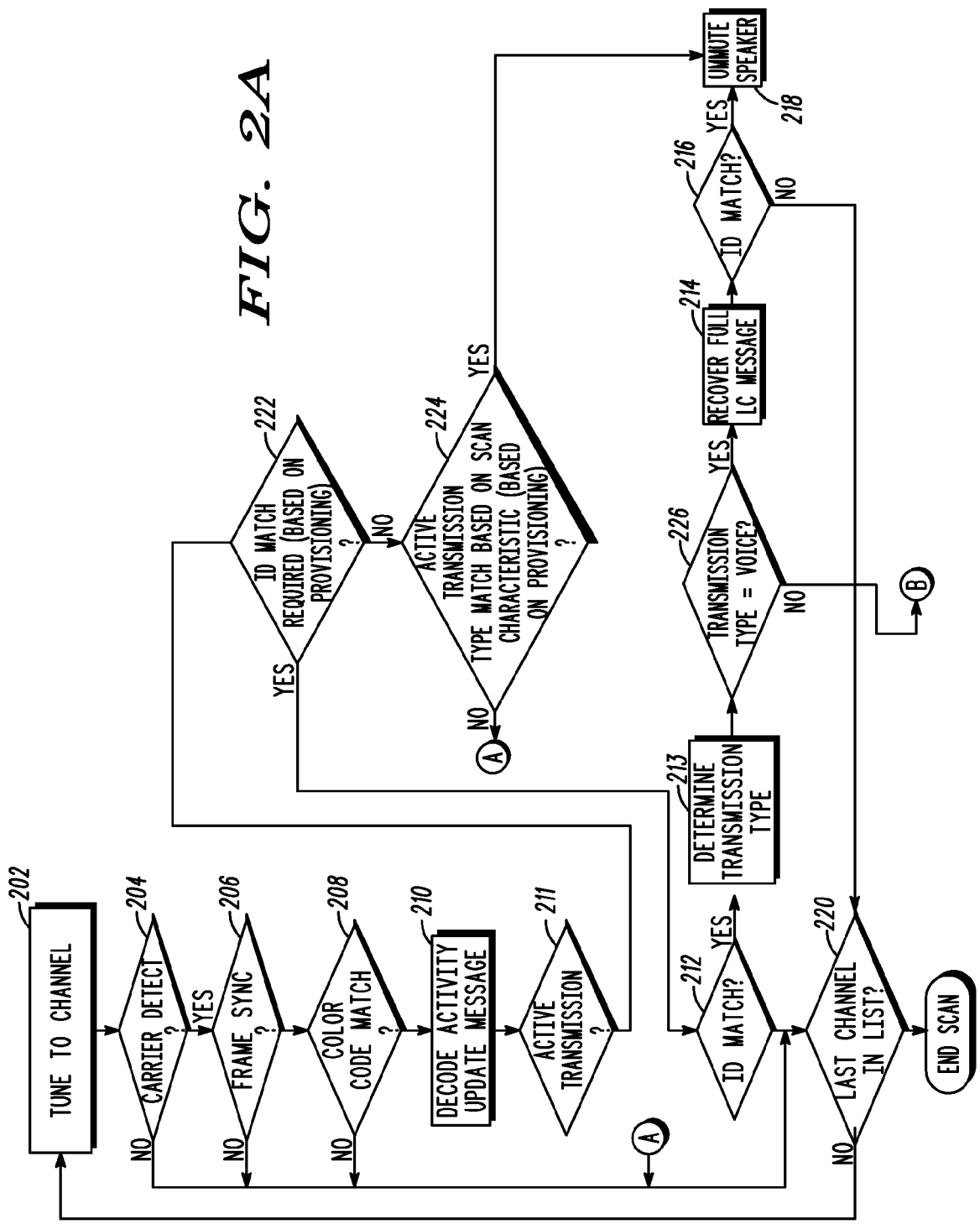
FIG. 2 is a flow diagram of an example method for providing channel access for voice transmissions.
Figure 2B:
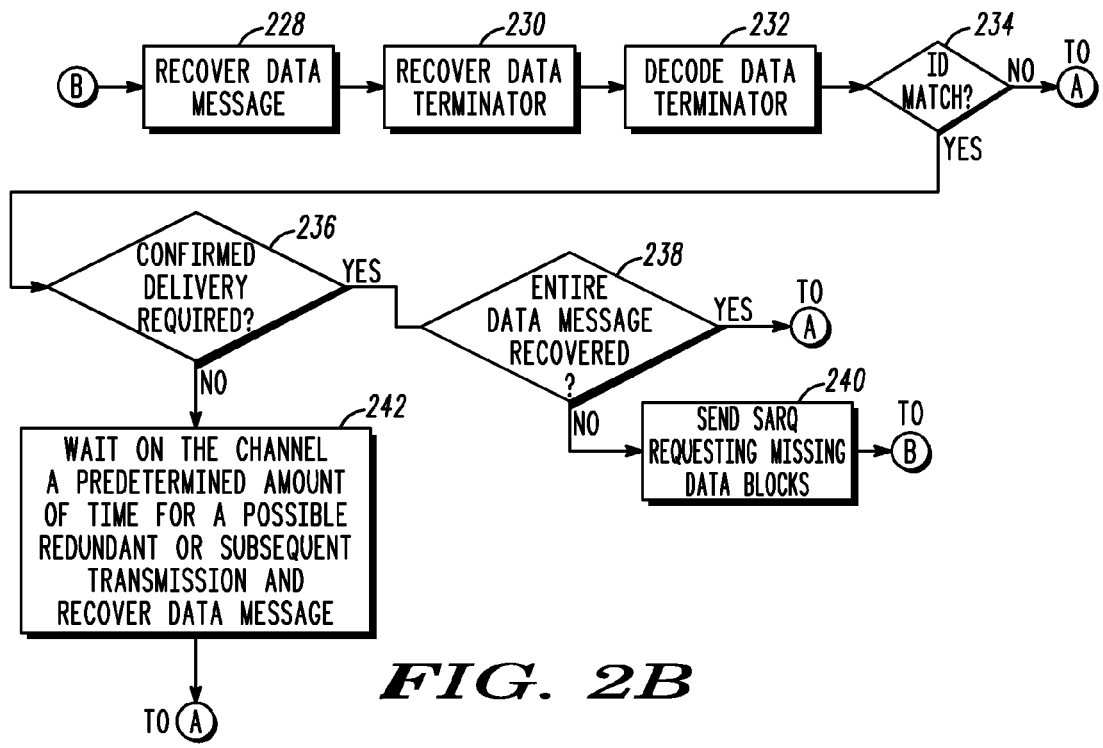

Referring to FIG. 2, in operation, an SU performs the function of scanning by tuning to a specified channel enumerated in a scan list preprogrammed in the scanning SU (Block 202). As is known in the art, a channel is also known as a "personality" where a personality is typically a radio frequency (RF) with additional qualifying information. The scanning SU pauses on the selected personality for a specified time period and tests whether an RF carrier is detected (Block 204). In one embodiment, a scanning SU which is programmed to scan only for voice transmissions pauses for 25 msecs before continuing.

As is known in the art, the specified time period depends upon the type of signal expected to be received by the scanning SU such as analog voice, FDMA digital, and TDMA digital. Further, the specified time period may depend upon the type of scan being performed. As mentioned above, the type of scan may depend upon a characteristic of the active transmission such as whether the active transmission is voice, data, group, individual, emergency, and non-emergency. For example, if the scanning SU is programmed to scan for channels only carrying data transmissions, then it may wait for 65 msecs before continuing If an RF carrier is present, then the scanning SU remains on the selected personality and performs synchronization (Block 206). In an illustrative embodiment, performing synchronization between the BR and the SU involves waiting a predetermined period of time for detecting a time slot synchronization signal. The time slot synchronization signal is a 48 bit (also known as 24 symbols) frame sync word. The time slot synchronization signal identifies the center of a TDMA burst and the type of communication present on the TDMA channel so that a receiver in the scanning SU may be able to receive transmissions on the TDMA channel. Performing synchronization is complete upon detection of the time slot synchronization signal within a predetermined period of time. In one embodiment, the scanning SU must receive the time slot synchronization signal within 335 msecs. If the communication between the SU and the BR is in synchronization or the SU is successfully able to perform synchronization between the BR and the SU, then the SU determines a color code for the active transmission on the channel (Block 208).

As is known in the art, regardless of whether a carrier is detected (Block 202), a scanning SU that receives a frame synchronization message further decodes the personality. Thus, if frame synchronization is performed, then the scanning SU remains on the personality an additional amount of time to determine whether there is a match of the color code for the active transmission on the channel (Block 208). If there is not a match of the color code (Block 208), frame synchronization (Block 206), or carrier detect (Block 204), then the scanning SU tunes to the next channel in the preprogrammed scan list (Block 220).

If there is a match of the color code for the active transmission on the channel, then the scanning SU remains on the channel and decodes a specific CACH message termed an "activity update" message 300 (Block 210). In an illustrative embodiment, the activity update message 300 is a 4-burst CACH message used to assist in identifying whether there is an active transmission (also termed "activity") on the channel. The activity update message 300 provides information that indicates whether the scanning SU should dwell on the channel or should resume scanning.

Figure 3:
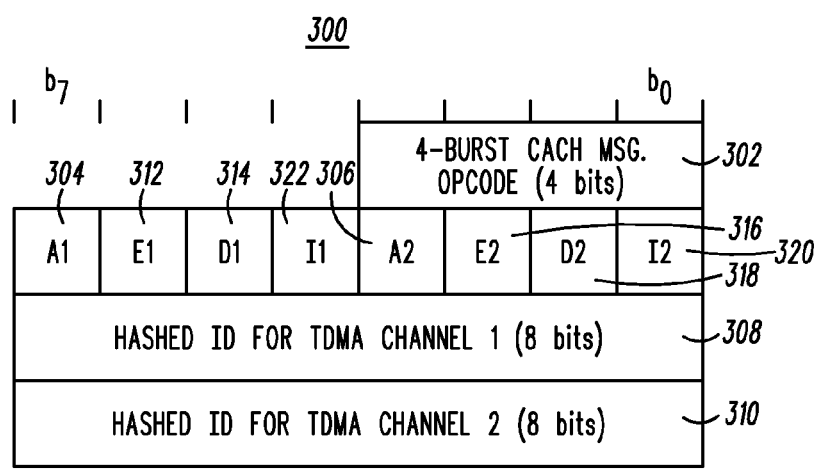
FIG. 3 is an example of a specific Common Announcement Channel message called an Activity Update.

As shown in FIG. 3, the activity update message 300 includes an activity field 304, 306 specific to each timeslot that indicates whether the channel is presently supporting a call or transmission on either of the timeslots. For example, as shown in FIG. 3, one-bit field 304 indicates whether timeslot one is supporting a call or transmission and one-bit field 306 indicates whether timeslot two is supporting a call or transmission where a value of "0" indicates that the timeslot is not active and "1" indicates an active transmission on the time slot. If there is an active transmission on the timeslot (Block 211), then the scanning SU determines whether the active transmission is of interest to the scanning SU. Otherwise, the scanning SU moves to the next personality in the preprogrammed scan list (Block 220).

Further, if an active transmission is present, then the activity update message 300 also has other information to identify the type of transmission. For example, the transmission may be voice, data, an emergency, talkgroup or individual transmission as shown in FIG. 3. As shown in FIG. 3, a voice or data transmission is signaled by one-bit fields 314, 318 where a value of "0" indicates that the active transmission is a voice transmission and "1" indicates that the active transmission is a data transmission. As shown in FIG. 3, an emergency or non emergency is signaled by one-bit fields 312, 316 where a value of "0" indicates that the active transmission is a non emergency transmission and "1" indicates that the active transmission is an emergency transmission. As shown in FIG. 3, a group or individual call is signaled by one-bit fields 320, 322 where a value of "0" indicates that the active transmission is a talkgroup transmission and "1" indicates that the active transmission is an individual transmission.

Further, besides the opcode field 302, the rest of the activity update message 300 is considered to be data and is populated by information from a full Link Control (LC) message for a voice transmission and from a data header for a data transmission. For example, the emergency one bit fields 312, 316, the group one bit fields 320, 322, and the addresses 308, 310 are recovered from the LC message or a data header.

If an active transmission is present and if the scanning SU is programmed to check the active transmission (Block 222) for a transmission addressed to a SU of interest, then the scanning SU determines whether the active transmission is addressed to a SU of interest (Block 212). Otherwise, the scanning SU checks to see if the scanning SU is programmed to receive the active transmission (Block 224). For example, the scanning SU may be programmed to receive all emergency calls regardless of identification (ID) of the source or destination of the active transmission. If the active transmission is of interest to the scanning SU, then the speaker is unmuted and audio is rendered to the user of the scanning SU (Block 218). Otherwise, the scanning SU moves to the next personality in the preprogrammed scan list (Block 220).

Further yet, if an active transmission is present, the activity update message 300 also identifies the SUID or TGID of the active transmission. As shown in FIG. 3, the identification field 308, 310 is an 8-bit hashed field as shown in FIG. 3. Further, because there are a limited number of bits in the activity update message 300, the ID field 308, 310 is hashed. For example, if the active transmission on timeslot 1 is directed to SU 16 and SU 16 is identified by a 24 bit SUID, then the ID field 308 is hashed to 8 bits. Another example is an active transmission on timeslot 2 directed to an SU in a talkgroup, e.g. SU 12, where the talkgroup is identified by a 16 bit TGID. Thus, the ID field 310 is hashed from the TGID of 16 bits to 8 bits. As is known in the art, there are many algorithms that can be used to perform the function of hashing and one such well known algorithm is a CRC-8 checksum with a generating polynomial of $g(x)=x^8+x^2+x+1$. With an input of a 16 bit TGID or a 24 bit SUID, the output is an 8 bit CRC hashed ID field 308, 310 as shown in FIG. 3.

As is known in the art, the activity update message 300 may be received before knowing the color code for the active transmission on the channel. In any case, knowing the color code for the active transmission on the channel and whether it matches the color code of the scanning SU is important to deciding whether to stop scanning or not. As mentioned above, if there is not a match of the color code (Block 208), then the scanning SU tunes to the next channel in the preprogrammed scan list (Block 220).

If the ID field 308, 310 of the activity update message 300 matches the SUID or TGID of the scanning SU (Block 212), then the scanning SU determines whether the active transmission is voice or data (Block 213).

If the active transmission is data (Block 226), then the scanning SU remains on the channel to recover the data message (Block 228) and waits until the end of the data transmission to receive a data terminator (Block 230). In an alternative, the scanning SU remains on the channel to receive embedded qualifying information. Continuing, the data terminator is decoded to identify addressing identification (or an "ID") (Block 232). If the ID is of interest to the scanning SU (Block 234), then the data message is further processed. Otherwise, the scanning SU tunes to the next channel in the preprogrammed scan list (Block 220). Continuing, the scanning SU determines whether confirmed delivery is requested (Block 236) for the data message. If confirmed delivery is requested, then the data message is processed until the entire data message is recovered (Block 238). In one embodiment, recovering an entire data message is performed by sending Selective Automatic Repeat Request (SARQ) messages to the BR. When the entire data message is recovered, the scanning SU tunes to the next channel in the preprogrammed scan list (Block 220). If confirmed delivery is not requested, then the scanning SU waits on the channel a predetermined amount of time for a possible redundant or subsequent transmission (Block 242). At the expiration of the predetermined amount of time, the scanning SU tunes to the next channel in the preprogrammed scan list (Block 220).

If the active transmission is voice (Block 226), then the scanning SU remains on the channel to perform a full link control (LC) qualification of the active transmission by decoding an LC message which identifies whether the active transmission is addressed to an individual SU or a talkgroup, an emergency or non emergency, and the source and destination of the active transmission (Block 214). In an illustrative embodiment, the LC message is a 7-burst CACH message. Performing full LC qualification means that the scanning SU waits for a LC message on the timeslot of interest and decodes an ID field of the LC message to determine whether the active transmission is of interest to the scanning SU. In an illustrative embodiment of the wireless communications landscape 100, because LC messages are available once every 360 msec, having to wait to decode a full LC message is time consuming for the scanning SU. If the ID field of the LC message is an ID of interest to the scanning SU (Block 216), then the speaker is unmuted and audio is rendered to the user of the scanning SU (Block 218). If the ID field of the LC message is not of interest to the scanning SU (Block 216), then the scanning SU tunes to the next channel in the preprogrammed scan list (Block 220).

If the ID field 308, 310 of the activity update message 300 does not contain an ID that is of interest to the scanning SU (Block 212), then the scanning SU moves to the next channel in the preprogrammed scan list. In such a case, the scanning SU does not have to wait for a LC message. Because the LC message only is sent once every 360 msec, not having to wait for a LC message improves the time that the scanning SU spends during the function of scanning. By not having to wait for a LC message, the scanning SU is able to quickly determine that the active transmission is not of interest and the scan function is improved.

As is known in the art, the timing of events relating to color code, the activity update message 300, and the LC message may occur in any order. For example, the activity update message 300 may be received by the scanning SU before 1) the color code of the active transmission is known or 2) the full LC message is received. Also, a full LC message may be received before 1) the activity update message 300 is received by the scanning SU or 2) the color code of the active transmission is known. Further, as shown in FIG. 2, the color code of the active transmission may be known before 1) the activity update message 300 is received by the scanning SU or 2) the full LC message is received.

In any case, determining whether to remain on the channel and render audio to the user of the scanning SU is based upon whether the received information is of interest to the user. Specifically, a match of the color code and the full LC message stops the function of scanning and renders audio to the user of the scanning SU. A match of the color code and ID field 308, 310 of the activity update message 300 stops the function of scanning but requires a match of the full LC message before rendering audio to the user of the scanning SU.

In an illustrative embodiment, a match of the ID field 308, 310 indicates that the active transmission may be of interest to the scanning SU. In such a case, the scanning SU remains on the channel and performs Link Control (LC) qualification of the active transmission before committing itself to remaining on the channel and rendering audio to the subscriber unit user. Alternatively, if there is not a match of the ID field 308, 310 then the scanning SU continues to scan with the next personality in the scan list.

By utilizing an activity update message 300 in the wireless communications landscape 100, the time spent while scanning is reduced. For example, in the embodiment described, a scanning SU is able to identify an active transmission of no interest on average in 152 msec. In a worst case, a scanning SU takes up to 335 msec to identify an active transmission of no interest. Without the use of an embodiment of the present invention, experimentation has shown that in an average TDMA system, a scanning SU is able to identify an active transmission is of no interest on average in 512 msec and in the worst case in 695 msec. Further, without the use of an embodiment of the present invention, experimentation has shown that in an average FDMA system, a scanning SU is able to identify an active transmission is of no interest on average in 360 msec and in the worst case in 540 msec.

Further yet, by utilizing an activity update message 300 in the wireless communications landscape 100, a SU that is a party to a call may quickly join the call if the SU is not currently a party to the call. Such an SU is called a late entry SU. For example, in the embodiment described, a late entry SU may join a call in a minimum of 120 msec. In a worst case, the late entry SU may join in about 300 msec. Without the use of an embodiment of the invention, experimentation has shown that a late entry SU takes about 360 msec and in the worst case about 720 msec to join a call.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method for scanning a TDMA channel by a subscriber unit in a wireless communications landscape 100, wherein the subscriber unit is operationally connected to at least one base radio over a plurality of channels, the method comprising the steps of:
   locking onto a channel of the plurality of channels by the subscriber unit wherein a subset of the plurality of channels is preprogrammed in a list in the subscriber unit;
   transmitting from at least one base radio a control message to the subscriber unit wherein the control message has a first information which informs the subscriber unit of activity present on the channel of the plurality of channels;
   receiving and decoding the control message for the first information by the subscriber unit; and
   if the first information indicates that activity is present on the channel of the plurality of channels, then
   determining whether the activity is of interest to the subscriber unit by comparing a second information in the control message with a third information preprogrammed in the subscriber unit and
   if the activity is of interest to the subscriber unit, then remaining on the channel of the plurality of channels to receive the activity present on the channel.

2. The method of claim 1 further comprising the step of rendering audio of the activity present on the channel to a user of the subscriber unit if the activity is of interest.

3. The method of claim 1 further comprising the step of determining whether the activity is a voice transmission or a data transmission.

4. The method of claim 1 wherein the control message is transmitted as frequently as once every 120 milliseconds.

5. The method of claim 1 wherein the control message is chosen from the group consisting of a 4 burst CACH message and a 7 burst LC message.

6. The method of claim 1 further comprising the step of tuning to the next channel in the list that is preprogrammed in the subscriber unit.

7. The method of claim 1 wherein the activity is of interest if the control message indicates that the activity is targeted for the subscriber unit.

8. The method of claim 7 wherein the second information indicates a characteristic of the activity wherein the characteristic is chosen from the group consisting of identification, voice, data, group, individual, emergency, and non emergency.

9. The method of claim 8 wherein the identification is a hashed address identifying a subscriber unit or a group of subscriber units.

10. The method of claim 8 further comprising the steps of:
   if the activity is a voice transmission, then
   recovering and decoding a link control message for identification information; and
   determining the link control message is of interest to the subscriber unit by comparing the identification information with a fourth information preprogrammed in the subscriber unit, and if the link control message is of interest then remaining on the channel to receive the activity present on the channel.

11. The method of claim 1 further comprising the step of rendering audio of the activity present on the channel to a user of the subscriber unit if the activity is of interest.

12. The method of claim 10 wherein the link control message is transmitted as frequently as once every 360 milliseconds.

13. The method of claim 8 farther comprising the steps of: if the activity is a data transmission, then
  recovering a data message and a data terminator;
  decoding the data terminator to identify address identification; and
  determining the data message is of interest to the subscriber unit by comparing the address identification with a fifth information preprogrammed in the subscriber unit, and if the data message is of interest then remaining on the channel to further process the data message.

14. The method of claim 13 wherein the third information and the fifth information refer to addresses and are the same information.

15. The method of claim 1 wherein the activity is of interest even if the control message indicates that the activity is not targeted for the subscriber unit.

16. The method of claim 1 wherein the second information indicates whether the activity is voice, data, group, individual, emergency, or non emergency.

17. In a TDMA system whereby the TDMA system comprises a plurality of subscriber units and a plurality of base radios, a method for scanning, the method comprising the steps of:
  locking onto a channel preprogrammed in a list of a subscriber unit whereby the channel carries activity on one timeslot of the TDMA system;
  receiving an activity update message from a base radio of the plurality of base radios wherein the activity update message indicates in a first information the activity on the channel and indicates in a second information at least one characteristic of the activity on the channel;
  determining whether the activity is of interest to the subscriber unit by comparing the at least one characteristic with preprogrammed third information in the subscriber unit; and
  if the activity is of interest, then remaining on the channel to receive the activity; otherwise moving to the next channel in the list.

18. The method of claim 17 wherein the characteristic is chosen from the group consisting of identification, voice, data, group, individual, emergency, and non emergency.

19. The method of claim 17 wherein the activity update message is a 4 burst CACH message.

20. The method of claim 19 wherein the activity update message further comprises fields for activity, data, emergency, individual, and identification.

21. A system for scanning a TDMA channel by a subscriber unit in a wireless communications landscape 100, wherein the subscriber unit is operationally connected to at least one base radio over a plurality of channels, the system comprising:
  a receiver for locking onto a channel of the plurality of channels wherein a subset of the plurality of channels is preprogrammed and whereby the receiver obtains an activity update message from the channel wherein the activity update message indicates in a first information activity on the channel and indicates in a second information at least one characteristic of the activity on the channel;
  a decoder for obtaining the at least one characteristic from the activity update message;
  a comparator which compares the at least one characteristic with third preprogrammed information indicating at least one preprogrammed characteristic to determine whether the activity is of interest to the system;
  a selector to receive activity which the comparator determines to be of interest
  wherein the operation of the receiver, the decoder, the comparator, and the selector are controlled by a processor.

22. The system of claim 21 wherein the at least one characteristic is chosen from the group consisting of identification, voice, data, group, individual, emergency, and non emergency.

23. The system of claim 22 wherein the activity update message is a 4 burst CACH message.

24. The system of claim 23 wherein the activity update message further comprises fields for activity, data, emergency, individual, and identification.

* * * * *

UNITED STATES PATENT AND TRADEMARK OFFICE
CERTIFICATE OF CORRECTION

| | | |
|---|---|---|
| PATENT NO. | : 7,369,869 B2 | Page 1 of 1 |
| APPLICATION NO. | : 10/899479 | |
| DATED | : May 6, 2008 | |
| INVENTOR(S) | : Wiatrowski et al. | |

It is certified that error appears in the above-identified patent and that said Letters Patent is hereby corrected as shown below:

ON THE FACE PAGE
   On the Face Page, in the Figure, for Tag "218", delete "UMMUTE" and insert -- UNMUTE --, therefor.

IN THE DRAWINGS
   In Fig. 2A, Sheet 2 of 3, for Tag "218", Line 1, delete "UMMUTE" and insert -- UNMUTE --, therefor.

IN THE SPECIFICATION
   In column 4, Line 17, after "continuing" insert -- . --.

IN THE CLAIMS
   In Column 9, Line 10, in Claim 13, delete "farther" and insert -- further --, therefor.

In Column 10, Line 32, in Claim 21, after "interest" insert -- , --.

Signed and Sealed this

Thirteenth Day of September, 2011

David J. Kappos
*Director of the United States Patent and Trademark Office*